United States Patent
Burbridge et al.

(10) Patent No.: US 9,712,422 B2
(45) Date of Patent: Jul. 18, 2017

(54) SELECTION OF SERVICE NODES FOR PROVISION OF SERVICES

(75) Inventors: Trevor Burbridge, London (GB); Andrea Soppera, London (GB)

(73) Assignee: British Telecommunications PLC, London (GB)

( * ) Notice: Subject to any disclaimer, the term of this patent is extended or adjusted under 35 U.S.C. 154(b) by 244 days.

(21) Appl. No.: 14/009,211

(22) PCT Filed: Mar. 16, 2012

(86) PCT No.: PCT/GB2012/000246
§ 371 (c)(1),
(2), (4) Date: Oct. 1, 2013

(87) PCT Pub. No.: WO2012/131287
PCT Pub. Date: Oct. 4, 2012

(65) Prior Publication Data
US 2014/0280963 A1    Sep. 18, 2014

(30) Foreign Application Priority Data

Apr. 1, 2011    (EP) .................................. 11250415

(51) Int. Cl.
*G06F 15/173* (2006.01)
*H04L 12/701* (2013.01)
(Continued)

(52) U.S. Cl.
CPC ............. *H04L 45/00* (2013.01); *H04L 47/70* (2013.01); *H04L 61/1511* (2013.01);
(Continued)

(58) Field of Classification Search
CPC ..... H04L 45/00; H04L 47/70; H04L 61/1511; H04L 67/1021; H04L 67/125; H04L 67/16; H04L 67/2842
(Continued)

(56) References Cited

U.S. PATENT DOCUMENTS 6,606,708 B1 * 8/2003 Devine et al. .................. 726/8
7,228,359 B1    6/2007 Monteiro
(Continued)

OTHER PUBLICATIONS

International Search Report for PCT/GB2012/000246 mailed Apr. 27, 2012.
(Continued)

*Primary Examiner* — Davoud Zand
(74) *Attorney, Agent, or Firm* — Nixon & Vanderhye PC (57) ABSTRACT

Methods and apparatus are disclosed for enabling selection of a remote service node from a plurality of possible nodes, each capable of providing a service, and each associated with a service node control entity. The method comprises: receiving a user request in respect of a service required by a user, the request containing a first user device routing identifier relating to the location in the network of the user device, and a service indication indicative of an appropriate service provider; identifying from the service indication a service node control entity associated with the service provider; sending to the service node control entity a service node request containing a second user device routing identifier differing from the first user device routing identifier but selected at least partly in dependence thereon; receiving from the service node control entity an indication of a remote service node capable of providing the required service; and providing an indication of the remote service node to the user device.

20 Claims, 5 Drawing Sheets

CDN Surrogate Selection - Top Level Architecture (51) Int. Cl.
  *H04L 29/12* (2006.01)
  *H04L 29/08* (2006.01)
  *H04L 12/911* (2013.01)
(52) U.S. Cl.
  CPC ........ *H04L 67/1021* (2013.01); *H04L 67/125* (2013.01); *H04L 67/16* (2013.01); *H04L 67/2842* (2013.01)
(58) Field of Classification Search
  USPC .................. 709/217, 218, 219, 226, 245
  See application file for complete search history.

(56) References Cited

U.S. PATENT DOCUMENTS

| 7,453,379 | B2* | 11/2008 | Plamondon | 341/87 |
| 7,460,038 | B2* | 12/2008 | Samuels et al. | 341/87 |
| 7,865,585 | B2* | 1/2011 | Samuels et al. | 709/223 |
| 8,786,473 | B2* | 7/2014 | Samuels et al. | 341/87 |
| 2002/0010798 | A1* | 1/2002 | Ben-Shaul et al. | 709/247 |
| 2006/0259625 | A1* | 11/2006 | Landfeldt | H04L 29/06 709/227 |
| 2010/0161799 | A1 | 6/2010 | Maloo | |
| 2011/0179176 | A1* | 7/2011 | Ravichandran et al. | 709/226 |
| 2012/0173759 | A1* | 7/2012 | Agarwal | H04L 67/2814 709/241 |
| 2012/0203825 | A1* | 8/2012 | Choudhary | H04L 65/4076 709/203 |

OTHER PUBLICATIONS

Written Opinion of the International Searching Authority mailed Apr. 27, 2012.
EP Search Report for EP 11250145 dated Aug. 2, 2011.
Contavalli et al: IETF proposal: "Client IP information in DNS requests", Neustar, May 2010, 24 pages.
Penno et al: Internet Draft: "ALTO and Content Delivery Networks", Cisco Systems, Oct. 2010, 22 pages.

* cited by examiner

Figure 1 – PRIOR ART: CDN Surrogate Selection - Top Level Architecture

Figure 2 - CDN Surrogate Selection - Top Level Architecture

Figure 3 - Tunnelling traffic between VLDR and domain authoritative DNS

Virtualised Domain List: VDL (41)

| Domain |
|---|
| cdn.net |
| c123.cdn2.com |
| C234.cdn2.com |

Virtual Location table: VLT (42)

| Client IP range | Network Rules | Virtual Location IP address |
|---|---|---|
| 201.15.* | A>5 | 201.15.34.67 |
| 201.15.* | | 201.14.34.67 |
| 201.12.* | | 201.12.54.87 |
| 201.10.* | | 201.10.32.6 |
| 201.10.30.* | | 201.10.66.4 |

Network Variables (43)

| Network Variable | Value |
|---|---|
| A | 7 |
| B | 3 |
| C | 8 |

Figure 4 - VLDR Additional Tables

Figure 5 - VLDR Process

SELECTION OF SERVICE NODES FOR PROVISION OF SERVICES

This application is the U.S. national phase of International Application No. PCT/GB2012/000246 filed 16 Mar. 2012 which designated the U.S. and claims priority to EP 11250415.4 filed 1 Apr. 2011, the entire contents of each of which are hereby incorporated by reference.

TECHNICAL FIELD

The present invention in certain example embodiments relates to the selection of service nodes for the provision of services. More specifically, aspects of the present invention relate to methods and apparatus for enabling the selection of a remote service node from a plurality of possible remote service nodes, the remote service nodes each being capable of providing a service to a user device via a data network. Preferred embodiments of the invention are particularly applicable in relation to the use of Content Delivery Networks (CDNs) for the delivery/distribution of data, but may also be applicable in relation to the provision of other types of services, particularly those which may involve the use of a Domain Name System (DNS) resolver.

BACKGROUND AND SUMMARY

A Content Delivery Network is a system of content-providing servers (or more generally, computers) generally operating under common control, the servers/computers each containing copies of items of data that one or more Content Provider organizations may wish to be able to provide (on request) to their existing or potential clients. The CDN computers are placed at various points in a data network so as to allow clients to access and obtain data content they require from a computer nearby (in the network), rather than all clients needing to access a single central server of the Content Provider organization in question.

Content Delivery Networks (henceforth CDNs) are increasingly being used by Content Provider organizations wishing to distribute their content to clients (sometimes referred to as "eyeballs"). The client devices can be as simple as web browsers, or may involve applications such as Internet Protocol television (IPTV) clients and set-top boxes.

The Content Provider organization is motivated in several ways. Firstly, using a CDN removes or reduces the requirement to host content on its own servers and ensure that these servers can offer the capacity required by numerous clients. Secondly the Content Provider reduces the capacity it requires from network service providers to connect its servers. Lastly the CDN can provide better service to the clients to experience the content. In this regard the CDN provides multiple content hosting sites (known as "surrogates") nearer to the client in the network. It does this by maintaining a large number of distributed surrogates, and selecting the one that will provide the best performance (in terms of network location and load on the server). For reasons that will be explained below, CDNs often make a poor choice of surrogate, because they often cannot tell where the client actually is in the network.

Many of today's CDNs use the Domain Name System (DNS) to decide which surrogate should serve the client. To do so the content is identified by a Uniform Resource Location (URL) which contains a domain name registered to the CDN. This can be because a link inside a website has been re-written to incorporate the CDN domain name, or simply because the CDN is operated by the content provider itself (for example Google/YouTube).

An example of a process for enabling a client device to obtain data from a Content Provider via a suitably-selected surrogate of a CDN will now be described with reference to FIG. 1.

Figure 1:
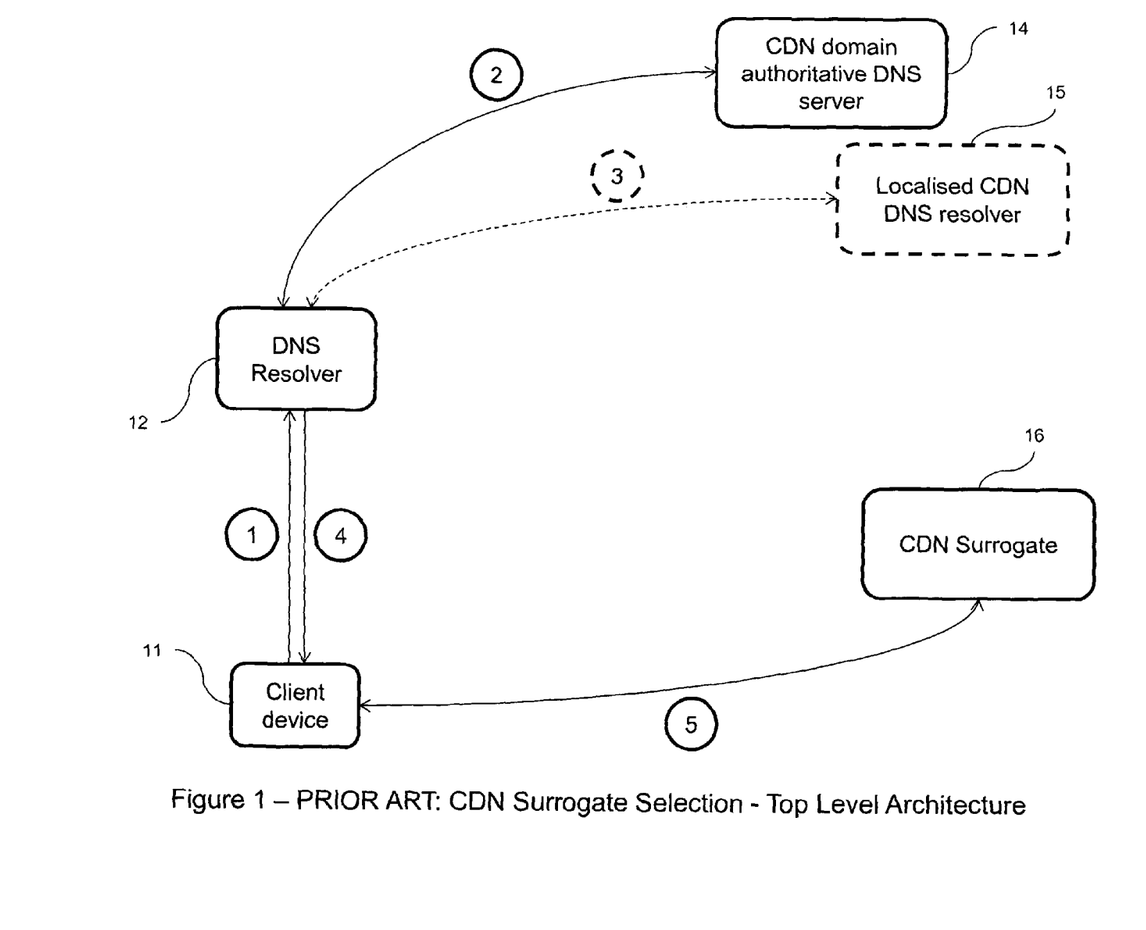
FIG. 1 indicates the top level architecture that may be involved in the selection of a CDN surrogate, according to a prior art technique.
Figure 2:
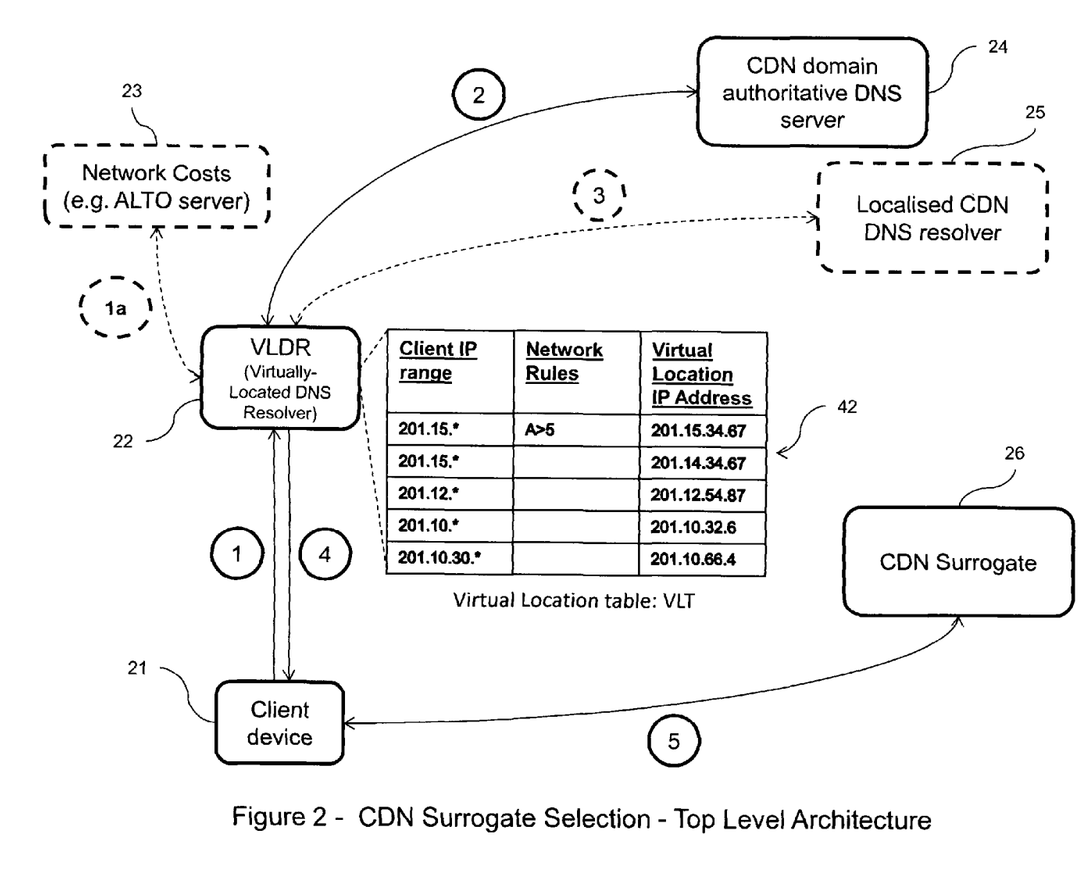
FIG. 2 indicates how the selection of a CDN surrogate may be performed according to a preferred embodiment.

In FIG. 1, a client device 11 contacts its DNS resolver 12 (stage 1, indicated by the number "1" in a circle) with a DNS query in respect of data from a Content Provider from which the client intends to obtain data. The DNS resolver 12 is typically located in the network of, or operated under the control of the client's Internet Service Provider (ISP), but may instead be provided by a third-party. Two examples of such third-party DNS services are "Google DNS" and "Open DNS". It should be noted that the practice of using non-ISP provided DNS resolvers is growing as users become disillusioned with ISP DNS performance or DNS hijacking practices (where mistyped DNS addresses are diverted, maliciously or otherwise, to marketing or other pages in order to generate "click-through" or sales revenue).

If the Content Provider organization intends the data item in question to be obtained from a CDN, it will generally have arranged for the DNS query from the client device to contain an indication at least of a domain name registered to the CDN. It should be noted that in receiving the DNS query from the client device, the DNS resolver 12 will (generally) also become aware (if it is not already aware) of the IP address of the client device 11. The IP address, which is effectively a routing identifier relating to the location in the network of the client device, enabling data to be routed thereto via an IP network, is generally needed by the DNS resolver for it to be able to provide a response to the client device once it has obtained the required information.

Before providing such a response, and in order to obtain the required information, the DNS resolver 12 identifies the appropriate CDN from the domain name information it has received, then interacts with a domain authoritative server 14 of the relevant CDN (stage 2), first contacting it, then receiving information from it. For reasons that will be explained below, the domain authoritative server 14 cannot (generally) 'see' the location of the client 11, but instead sees and uses the IP address of the DNS resolver 12 as representative of the location of the client 11, and selects a CDN surrogate 16 on the basis thereof. Where the DNS resolver 12 is provided centrally by an ISP, this location is often less granular than the distribution of the CDN surrogates also situated within the ISP network, often leading to poor or random selection of a CDN surrogate within that network, higher network costs and a less-satisfactory user experience. Further, where the DNS resolution is provided 'off-net' (i.e. by a third-party such as Open DNS or Google DNS, rather than by the ISP itself), the CDN may not even be able to tell which ISP the client 11 is using, which generally makes it difficult or impossible for an appropriate local CDN surrogate 16 to be selected and used (at least on the basis of the IP address seen by the domain authoritative server 14 of the CDN), and therefore generally leads to such content requests being served from CDN nodes at major peering locations.

A further interaction (shown as a dotted arrow marked as stage 3 in FIG. 1) may also happen between the DNS resolver 12 and a localized CDN DNS resolver 15. This may happen if, for example, the result of the interaction (step 2) between the DNS resolver 12 and the domain authoritative server 14 of the CDN is merely to identify a cluster of CDN surrogates (those in a particular country, for example), in which case the possible further interaction (stage 3) between the DNS resolver 12 and the localized CDN DNS resolver 15 may be in order to identify a particular CDN surrogate within that cluster. This may be done in order to allow for load-balancing between the CDN surrogates within the cluster in question, for example.

After stage 2 (and possibly stage 3), the DNS resolver 12 then provides a response to the client device 11 (stage 4) indicating the selected CDN surrogate 16, allowing the client device 11 to request and obtain the required content from that CDN surrogate (stage 5).

ISPs may not want to highly distribute their DNS resolvers in the light of the possible cost savings obtainable by operating them centrally, such as higher and more predictable utilization, central hosting facilities and higher DNS cache hit-rates. Third-party providers do not generally have the option to deploy DNS servers/resolvers locally (within the ISP) and this would be prohibitively expensive in any case.

Further, even if the DNS resolver location is representative of client location, such techniques do not take into account any performance or preferences concerning the network used to deliver the content from the CDN surrogate to the client. A surrogate may be chosen despite the path from it (currently or generally) being under-provisioned or suffering from latency or congestion.

An IETF proposal entitled "Client IP information in DNS requests" dated 21 May 2010 (available online at http://tools.ietf.org/html/draft-vandergaast-edns-client-ip-01) proposes a modification of the DNS resolution process to allow the client's IP address to be passed through the DNS resolver. While effectively solving the inability identified above of a domain authoritative server of a CDN to determine the client device's actual location, network information would not be available to the domain authoritative server, so would still need to come from another source if account is to be taken of it in the selection of an appropriate CDN surrogate. In addition, the standards need to be set and adopted, which will take time and may ultimately fail. There is also a potential concern over the user's privacy. Although a subnet mask can be applied to the user's full IP address (effectively aggregating the behavior of users together), there is still a strict mapping between a set of users and the IP address subnet visible to the domain level DNS resolver. By analyzing traffic over time it may still be possible to group traffic that is likely to belong to the same user. Although it might be argued that the CDN will eventually see the full IP addresses and URLs that these clients are interested in (if when they eventually obtain content from the chosen surrogate), it is possible that in future scenarios the surrogate may belong to another CDN (in situations where two or more CDNs federate together to provide service).

Another IETF working group, ALTO (information about which is available online from https://datatracker.ietf.org/wg/alto/charter/), has been working on solutions for ISPs to be able to share network cost information with CDN providers (see for example an Internet Draft entitled: "ALTO and Content Delivery Networks" dated 25 Oct. 2010, available online from: http://tools.ietf.org/html/draft-penno-alto-cdn-02), an aim being to enable CDN providers to make an informed choice of surrogate. This does not solve the problem of locating the client, however. It also potentially exposes confidential information from the network provider to the CDN.

Together, DNS extensions to show client IP addresses and possible developments under the ALTO project discussed above could, if used together in an appropriate manner, lead to a solution to the problem outlined above. Both proposals are at an early stage, however, and may suffer setbacks from issues of privacy or confidentiality, or simply failure to develop an appropriate standard and implement it within ISPs and CDNs.

The other approach is simply to build a highly distributed DNS resolver network within the ISP and encourage clients to use those DNS resolvers, The ISP "knows" the location of the client and can assign the client to use the nearest DNS resolver (for example using Dynamic Host Configuration Protocol (DHCP) or capability in the Remote Access Server (RAS)). However the build-out of distributed DNS infrastructure is costly, lowers the ability to perform dynamic DNS load balancing (while running the DNS servers at high utilization), and may also lower the effectiveness of the DNS caching in each resolver.

Referring briefly to prior art patent citations, U.S. Pat. No. 7,228,359 relates to methods and apparatus for providing domain name service based on a client identifier. In particular, it describes a content distribution system which has a DNS server which is configured to provide DNS responses in response to DNS requests, and a device which interconnects between a client and the DNS server. The device includes an interface which communicates with the client, and a controller coupled to the interface. The controller can intercept a first DNS request en route from the client to the DNS server, and provide a second DNS request to the DNS server through the interface in response to interception of the first DNS request.

US patent application US 2010/0161799 relates to a system and method for obtaining content from a CDN. The method involves receiving from a first server a first DNS request including a first IP address of a first server, and a second IP address received by the first server from a first system. The method maps a correlation between the first IP address and the second IP address, and receives from the first server a second DNS request. In response to receiving the second DNS request, the method responds to the first server with a third IP address of a second server, wherein the third IP address is chosen based upon the second IP address.

According to a first aspect of the present invention, there is provided a method of enabling selection of a remote service node from a plurality of possible remote service nodes, the remote service nodes each being capable of providing a service to a user device via a data network, and each being associated with at least one service node control entity, the method comprising:

receiving from a user device a user request in respect of a service required by a user, the user request containing a first user device routing identifier relating to the location in the network of the user device, and a service indication indicative of a service provider from which the user requires service;

identifying from the service indication a service node control entity associated with the service provider;

sending to the service node control entity a service node request, the service node request containing a second user device routing identifier, the second user device routing identifier differing from the first user device routing identifier and being selected in dependence on the first user device routing identifier from a plurality of predetermined user device routing identifiers;

receiving from the service node control entity an indication of at least one remote service node capable of providing the required service to the user device; and providing an indication of the at least one remote service node to the user device.

By differing from the first user device routing identifier, the second user device routing identifier is able to relate to or to identify a location in the network that differs from the location in the network to which the first user device routing identifier relates.

According to preferred embodiments, the predetermined user device routing identifiers each differ from the first user device routing identifier, and may thus each relate to or identify different locations in the network that differ from the location in the network to which the first user device routing identifier relates.

According to preferred embodiments, in particular those for use in relation to IP networks, the routing identifiers are IP addresses.

According to preferred embodiments, the method is performed by or under the control of a selection entity, which may comprise a suitably-enabled Domain Name System resolver module. In such embodiments, the predetermined user device routing identifiers may be routing identifiers allocated to the selection entity, the user device routing identifiers therefore relating in fact to actual or virtual locations in the network of the selection entity.

According to preferred embodiments, the service comprises delivery of data, via one or more CDNs, for example. Alternatively, the service may comprise a remote data processing service, or another type of networked service, such as an "online gaming" service, for example. Alternatively, the service may comprise a load balancing service, or selection of a further service node for provision of a further service such as one of the above.

According to preferred embodiments, the service indication may comprise an indication of the service node control entity. The service indication may be in the form of or include a domain name, a Uniform Resource Identifier (URI), or a Uniform Resource Locator (URL), found on and selected from a website by a user. In relation to scenarios where the service concerned involves the delivery of data via a CDN, the service indication may comprise an indication of the actual data item(s) required, and/or an indication of the identity of a content provider purporting to be capable of providing the data item(s) required, and/or an indication of a CDN purporting to be capable of delivering the data item(s) required.

According to preferred embodiments, the method may further comprise obtaining one or more indications of network conditions, the second user device routing identifier being selected in dependence on the one or more indications of network conditions (i.e. as well as in dependence on the first user device routing identifier).

According to a second aspect of the present invention, there is provided an apparatus for enabling selection of a remote service node from a plurality of possible remote service nodes, the remote service nodes each being capable of providing a service to a user device via a data network, and each being associated with at least one service node control entity, the apparatus comprising means for performing a method according to any of the preceding claims.

The various options and preferred embodiments referred to above in relation to the first aspect are also applicable in relation to the second aspect.

Briefly, preferred embodiments of either aspect may be used to enable a better selection of remote service node to be made for a client. In the context of the provision of data via a CDN, preferred embodiments may be used to enable a better selection of CDN surrogate to be made, by overcoming the current problem whereby CDNs often cannot tell where the client actually is in the network.

Looking at this in more detail, preferred embodiments allow an ISP essentially to "intelligently" select and use a 'virtual' DNS resolver for a service node selection operation, regardless of the physical location of the DNS resolver used by the client. This allows the ISP to use any pattern of DNS resolver deployments, including the use of centralized DNS clusters of shared DNS resolvers with high utilization, high availability and close load balancing. Irrespective of the actual DNS resolver location, the ISP can "pretend" that a DNS resolver exists, and is being used, anywhere in their network. This also allows extremely rapid deployments of 'new' (virtual) DNS resolver locations (since these do not need to be physical servers).

Methods according to preferred embodiments can be deployed immediately since they do not generally depend on or require any new standardization activity or extension to existing protocols. Beyond the ISP's DNS resolver, the DNS system may work as currently standardized and operated. Further, no information regarding network topology, costs or utilization needs to be shared with the CDN. Network cost information can be incorporated into the decision process about which virtual DNS resolver location to use for a particular client call. This allows the network cost decision to be placed firmly within the ISP domain rather than the ISP needing to rely on the CDN to react to network cost information. It also means that preferred embodiments may work immediately without requiring each and every CDN to adopt standards such as "ALTO" standards to be able to ingest network cost information. The surrogate choice of any CDN can be affected regardless of the implementation of technology within the CDN (provided they use a DNS lookup or similar operation to make the choice of surrogate), even where the CDN is not trusted with network information or to make a decision in the interests of the ISP.

BRIEF DESCRIPTION OF THE DRAWINGS

A preferred embodiment of the present invention will now be described with reference to the appended drawings, in which.

DESCRIPTION OF PREFERRED
EMBODIMENTS OF THE INVENTION

With reference to the accompanying figures, a method according to a preferred embodiment will be described in relation to the context of a scenario involving the use of a CDN for the delivery/distribution of data, the CDN responding to a request submitted via a suitably enabled DNS resolver. It will be understood that embodiments may also be applicable in relation to the provision of other types of services, particularly (but not exclusively) those which may involve requests for service being submitted via DNS resolvers.

The technique to be described does not require the DNS protocol to be modified to pass through client IP addresses. Instead a suitably-enabled DNS resolver uses a pre-selected set of outgoing IP addresses, which are used to represent key locations in the ISP network. The resolver selects one of these outgoing IP addresses based upon the client IP address, its knowledge of the network topology, and any available static and dynamic network cost information. Such cost information may come from network management systems, pre-configured policies or developments such as those within the IETF ALTO working group which provided a costed network map.

The CDN domain authoritative DNS server will see the IP address chosen by the DNS resolver and will choose a surrogate based upon this IP address and the location it represents or is associated with instead of the actually physical site of the DNS resolver.

In detail, the client application for the content delivery may be an application running on a host platform. This may be a web browser on a PC, an IPTV client on a set-top box or any other application/device combination that requires access to cacheable content. The content is identified through a URI (Uniform Resource Identifier) that includes a DNS domain name (such as a URL or Uniform Resource Locator). This identifier may have been retrieved through a number of different mechanisms such as an IPTV catalogue or as an embedded URL link in a previously retrieved web page. The host has previously been configured with a primary, and potentially other, DNS resolver addresses. Such configuration can be achieved by the network RAS (Remote Access Server), DHCP server (Dynamic Host Configuration Protocol) or may be statically configured by the host administrator. The host is configured with the IP address of a DNS Resolver that implements aspects of the proposed technique. We call such an enhanced DNS resolver a "Virtually Located DNS Resolver" or VLDR.

Referring to FIGS. 2 to 5, when a user or client wishes to download or stream data (such as audio or video data, for example) that is distributed using a CDN, the VLDR 22 receives a DNS query from the client host device 21. This is indicated by the number "1" in a circle, as it corresponds to stage 1 in FIG. 1, and is also shown as step s51 in FIG. 5. At this stage, the VLDR 22 operates as a normal DNS resolver in respect of most of the DNS namespace. It consults its cache (step s52 of FIG. 5) for the DNS resolution result. If the result is already in cache, the process may proceed directly to step s62, and return the DNS result to the client. If such a cached result is not available it directs the DNS request to the relevant domain authoritative DNS server (step s53). If it does not know the domain level DNS server address it may first use a DNS root server (step s54) to locate the domain authoritative DNS server.

The VLDR now performs at least one additional process stage before sending the query to the domain authoritative DNS server. Having failed to retrieve a result from the cache for the IP address of the domain name, the VLDR compares the domain name against a table of domains for which virtualized locations are to be implemented (step s55). We refer to this table as the "Virtualization Domain List" or VDL, an example of which is shown as item 41 in FIG. 4. Typically this may be a list of domains registered to CDN operators. If the domain name is not contained in the VDL 41 then the DNS domain level lookup proceeds as normal, proceeding to step s59. In this case the VLDR uses an output interface with an IP address reflecting its actual location in the network. However, if the domain name matches name in the VDL the process instead proceeds as follows.

At step s56, the VLDR 22 now consults another table, using the client's IP address as the primary index. This table contains entries mapping client address ranges against the location of the virtual DNS resolver. We term this table the "Virtual Location Table" or VLT, an example of which is shown as item 42 in FIG. 4. In different implementations the client IP address ranges may be specified by IP subnet masks, or as 'from' and 'to' IP address ranges. The virtual location may be specified as an IP address, or use a location reference (e.g. "location L23") that may relate to an IP address in a further lookup table. The VLT 42 may contain multiple possible virtual locations for the same client IP address. In these cases the VLT may contain additional columns to enable the selection of a unique location. If selection of a unique location is not possible then the VLDR 22 may perform load-balancing, randomly allocate virtual locations, or simply choose the first option between the multiple locations, for example. The VLDR 22 may also choose the location mapped to the longest prefix match of the client IP address—that is the entry in the table that has the most specific IP address subnet for the client IP address in question. For example, if the client IP address is 201.10.30.56, the table entry for 201.10.30.* is preferred to that for 201.10.*

Additional columns in the VLT 42 may be used to express location selection rules. Multiple columns may be used for rules of different expression formats. Such rules may capture network costs and conditions that may influence the selection of the virtual location. For example, a simple rule might select between two different virtual locations depending upon the costs allocated to respective network paths. Cost information may be received from an external server 23 in an additional interaction shown as "1a" in FIG. 2, the network rules being resolved in an additional step s57 in FIG. 5. Alternatively, cost information may already be held by the VLDR, having been obtained previously (i.e. prior to receipt of the DNS query from the client host device 21), or may be obtained in other ways. To continue the example, if A>5 (where "A" is the name assigned to a particular network path and "5" is an expression of cost associated with use of that path), then one entry will be selected, while in all other cases a second entry will be used. For expressions of this type there may be a store of network variables and their associated values held within the VLDR. An example of such a table is shown as item 43 in FIG. 4

Figure 5:
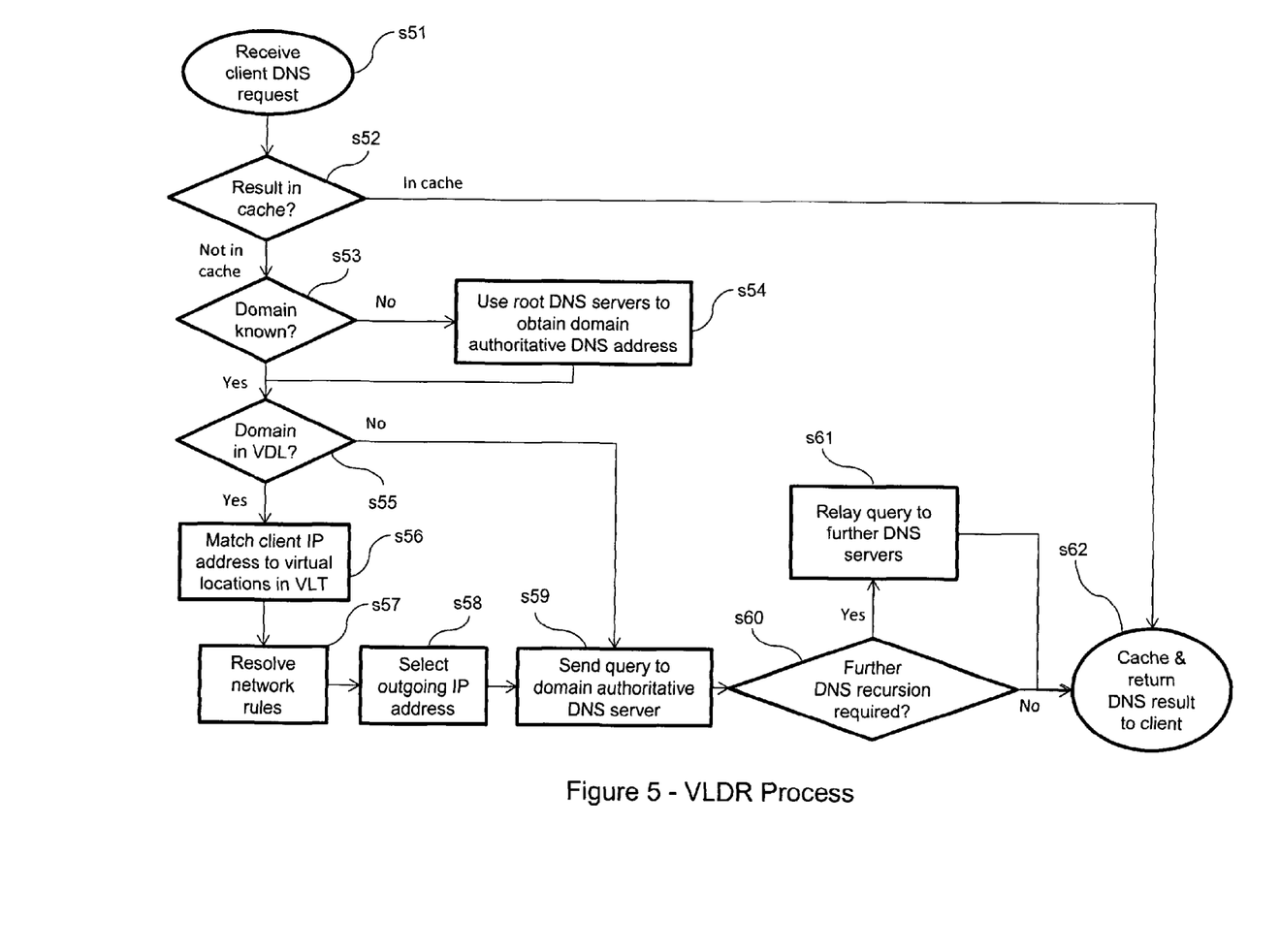
FIG. 5 illustrates the process that may be performed by the VLDR of FIG. 2.

Once a location is selected (step s58) from the VLT (and resolved to an IP address if the location is not already in this format), then the VLDR recurses the DNS request to the domain authoritative DNS server using the outgoing IP address of the virtual location (step s59). If it is found (at step s60) that further DNS recursion is required, a possible further interaction (indicated as stage 3 in FIG. 2) may happen between the VLDR 22 and a localized CDN DNS resolver 25, relaying the query (at step s61) to the localized resolver 25 in order to identify a particular CDN surrogate within an identified cluster of surrogates, for example.

Figure 3:
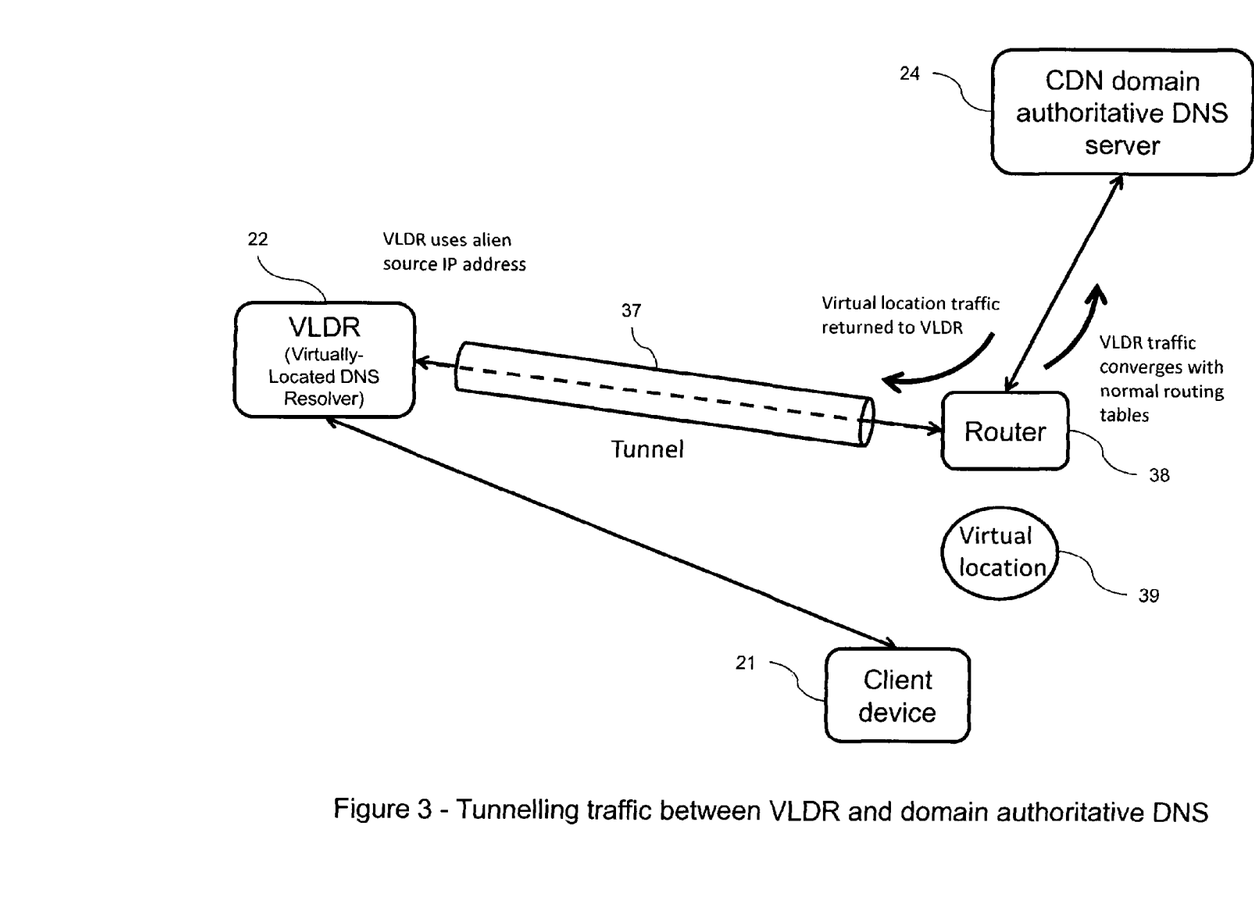
FIG. 3 illustrates the tunnelling of traffic between the Virtually Located DNS Resolver (VLDR) and the CDN Domain Authoritative DNS server of FIG. 2.
Figure 4:
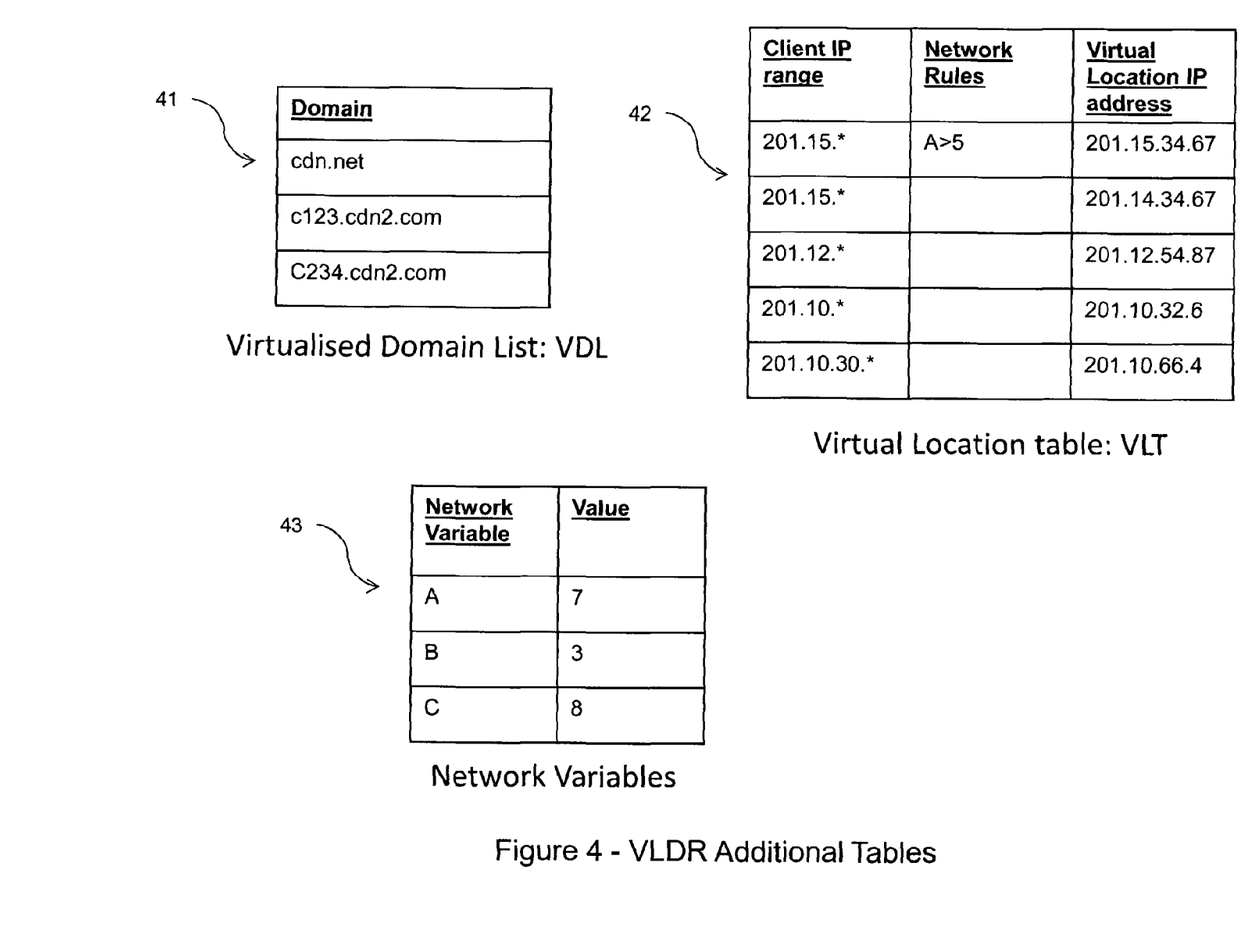
FIG. 4 shows additional tables that may be held in and/or used by the VLDR of FIG. 2.

In order to perform its function as set out above, the DNS resolver is able to use different outgoing IP addresses. This can be achieved either by 'spoofing' the IP address on the same network interface or by using multiple interfaces that are allocated the different address choices. The network between the DNS resolver and the CDN domain authoritative DNS server must be configured to route these IP addresses correctly. This can be achieved either through specific entries in the IP routing tables, or, with reference to FIG. 3, by tunnelling these 'alien' IP addresses via an IP tunnel 37 to a point in the network such as router 38 where they converge with the normal routing tables for their address subsets. At these convergence points routing tables should be modified to return the reply from the domain authoritative DNS server to the VLDR (e.g. back along the tunnel). Traffic must be returned to the VLDR so that additional calls can be made to sub-domain DNS servers and finally the results returned to the client. In FIG. 3, Virtual Location 39 illustrates the position in the network to which traffic would naturally be sent without specific routing table entries to divert traffic returning to the VLDR through the tunnel. Hence, Virtual Location 39 is also the network location at which the domain authoritative DNS server expects the DNS Resolver to reside.

Once the DNS resolution result has been obtained, the process proceeds to step s62, the DNS result being cached for possible future use (i.e. if subsequently found in step s52 in relation to a subsequent client request) and returned to the client, who may then use it in order to contact the relevant surrogate 26 directly. It should be noted that in some CDN implementations the result returned to a client will not respond directly to a surrogate, but to a request router. This device may perform final load balancing, provide resilience across a number of CDN surrogates, or perform additional policy checks (such as checking that the client IP address is within a particular range for geographic constrained content). The request router will then direct the client to the CDN surrogate, or other service (such as a web page saying the content is unavailable).

In an alternative deployment the process does not have to be implemented on the main DNS resolvers but may instead be implemented on more specialized DNS resolver equipment. Thus the bulk of the DNS requests would go to the standard DNS resolvers while only traffic for the CDN network would be intercepted and passed to the specialized DNS resolver equipment implementing the process. This can be achieved by placing Deep Packet Inspection (DPI) equipment between the client and the DNS resolver and matching for DNS requests to the CDN domains. Alternatively the functionality described for the VLDR may be split with the VDL held on the first DNS Resolver, and the VLT held by a second server.

The invention claimed is:

1. A method of enabling selection of a remote service node from a plurality of possible remote service nodes, the remote service nodes each being configured to provide a service to a user device via a data network, and each being associated with at least one service node control entity, the method comprising, at a selection entity:
   receiving from a user device a user request in respect of a service required by a user, the user request containing a first user device routing identifier relating to the location in the network of the user device, and a service indication indicative of a service provider from which the user requires service;
   identifying from the service indication a service node control entity associated with the service provider;
   sending to the service node control entity a service node request, the service node request containing a second user device routing identifier;
   receiving from the service node control entity an indication of at least one remote service node capable of providing the required service to the user device; and
   providing an indication of the at least one remote service node to the user device;
   wherein the second user device routing identifier is selected by the selection entity from a plurality of predetermined user device routing identifiers that are available for use in respect of requests received from the user device and which differ from the first user device routing identifier and relate to a location in the network that differs from the location in the network to which the first user device routing identifier relates, the selection being made by the selection entity in dependence on the first user device routing identifier contained in the user request received by the selection entity from the user device.

2. The method according to claim 1 wherein the predetermined user device routing identifiers each differ from the first user device routing identifier and relate to locations in the network that differ from the location in the network to which the first user device routing identifier relates.

3. The method according to claim 1 wherein the routing identifiers are IP addresses.

4. The method according to claim 1 wherein the selection entity comprises a Domain Name System resolver module.

5. The method according to claim 1 wherein the predetermined user device routing identifiers are routing identifiers allocated to the selection entity.

6. The method according to claim 1, wherein the service comprises delivery of data.

7. The method according to claim 1, wherein the service comprises a remote data processing service.

8. The method according to claim 1, wherein the service comprises a networked service.

9. The method according to claim 1, wherein the service comprises a load balancing service.

10. The method according to claim 1, wherein the service comprises selection of a further service node for provision of a further service.

11. The method according to claim 1, wherein the service indication comprises an indication of the service node control entity.

12. The method according to claim 1, the method further comprising obtaining one or more indications of network conditions, the second user device routing identifier being selected in dependence on the one or more indications of network conditions.

13. The method according to claim 1 wherein the second user device routing identifier is selected by the selection entity following receipt by the selection entity from said user device of said user request.

14. Apparatus for enabling selection of a remote service node from a plurality of possible remote service nodes, the remote service nodes each being configured to provide a service to a user device via a data network, and each being associated with at least one service node control entity, the apparatus comprising at a selection entity:
   at least one hardware processor operatively coupled to a memory; and
   a communication circuit;
   wherein the at least one hardware processor is configured to cooperate with the communication circuit and to control the selection entity to at least:
      receive from a user device a user request in respect of a service required by a user, the user request containing a first user device routing identifier relating to the location in the network of the user device, and a service indication indicative of a service provider from which the user requires service;
      identify from the service indication a service node control entity associated with the service provider;

send to the service node control entity a service node request, the service node request containing a second user device routing identifier;

receive from the service node control entity an indication of at least one remote service node capable of providing the required service to the user device; and provide an indication of the at least one remote service node to the user device;

wherein the second user device routing identifier is selected by the selection entity from a plurality of predetermined user device routing identifiers that are available for use in respect of requests received from the user device and which differ from the first user device routing identifier and relate to a location in the network that differs from the location in the network to which the first user device routing identifier relates, the selection being made by the selection entity in dependence on the first user device routing identifier contained in the user request received by the selection entity from the user device.

15. The method according to claim 12 wherein the second user device routing identifier is selected by the selection entity following receipt by the selection entity from said user device of said user request.

16. The apparatus according to claim 14 wherein the predetermined user device routing identifiers each differ from the first user device routing identifier and relate to locations in the network that differ from the location in the network to which the first user device routing identifier relates.

17. The apparatus according to claim 14 wherein the routing identifiers are IP addresses.

18. The apparatus according to claim 14 wherein the second user device routing identifier is selected by the selection entity following receipt by the selection entity from said user device of said user request.

19. The apparatus according to claim 14, wherein the at least one hardware processor is configured to further control the selection entity to at least obtain one or more indications of network conditions, the second user device routing identifier being selected in dependence on the one or more indications of network conditions.

20. The apparatus according to claim 19, wherein the second user device routing identifier is selected by the selection entity following receipt by the selection entity from said user device of said user request.

* * * * *